Nov. 4, 1969　　　C. T. WEEMS　　　3,477,005
REMOTE AMPERAGE CONTROL DRIVE FOR ELECTRIC WELDERS
Filed Jan. 26, 1967　　　3 Sheets-Sheet 1

INVENTOR
Calvin T. Weems

BY　*Cecil L. Wood*

ATTORNEY

Nov. 4, 1969     C. T. WEEMS     3,477,005

REMOTE AMPERAGE CONTROL DRIVE FOR ELECTRIC WELDERS

Filed Jan. 26, 1967     3 Sheets-Sheet 2

INVENTOR
Calvin T. Weems

BY

ATTORNEY

INVENTOR
Calvin T. Weems

BY Cecil L. Rood
ATTORNEY

United States Patent Office 3,477,005
Patented Nov. 4, 1969

3,477,005
REMOTE AMPERAGE CONTROL DRIVE
FOR ELECTRIC WELDERS
Calvin T. Weems, 5728 4th St.,
Marrero, La. 70072
Filed Jan. 26, 1967, Ser. No. 611,923
Int. Cl. H02p 1/22, 1/40, 3/20
U.S. Cl. 318—266                                    4 Claims

ABSTRACT OF THE DISCLOSURE

A device for attachment to an electric arc welding machine, having a manual amperage control knob thereon, whereby to enable the operator of the machine to rotate the control knob by a reversible motor connected into electrical circuits having a switch therein accessible near the welding operation and remote from the machine.

SUMMARY

This invention relates to remote control means for regulating the amperage of an electric welding machine, and it has particular reference to an attachment for an electric arc welder for controlling the amperage of the machine from a distant location corresponding to the welding site.

Portable electric welding apparatus, consisting of an electric generator driven by an internal combustion engine, are in common use. Such devices are capable of being moved about a work area and may have substantial length of cable for welding operations but in many instances it is desirable to perform such operations at some distance from the generator so that some means of controlling the amperage output to suit the particular operation is necessary.

The apparatus, which includes the generator, is provided with a rheostat by which the amperage flow is controlled by rotating a knob having a pointer cooperating with a dial or scale having indicia thereon, the knob being manually operable. Such a device may require frequent adjustments which could not be conveniently performed when the work is remotely situated with respect to the control knob.

A prime object of the invention is that of providing a mechanism for attachment to a conventional electric arc welder and operatively associated with the manual amperage control knob by which the latter can be rotated in either direction by an electric motor which can be energized by electric circuits in each of which is provided a switch located near the welding electrode, and convenient to the operator, so that the amperage output of the generator can be readily and easily adjusted as the welding operations are performed.

The control device includes a rotor connected to the shaft of the reversible electric motor and having means for engaging the rheostat control knob to rotate the latter to increase or decrease the amperage output as required. The arrangement is especially useful in performing welding operations on elevated structures, such as structural steel buildings, elevated tanks, and in ship building where it becomes necessary to perform welding operations in various parts of the vessel on different elevations.

The invention is applicable to a type of welding machine which includes a transformer whereby the electric current as supplied from a source, which may have a voltage of 220 or 440, for example, is converted to a current of relatively lower voltage suitable for welding.

DESCRIPTION OF THE DRAWINGS

While the foregoing objects are paramount, other and lesser objects will become apparent as the description proceeds when considered with the appended drawings wherein.

Figure 1:
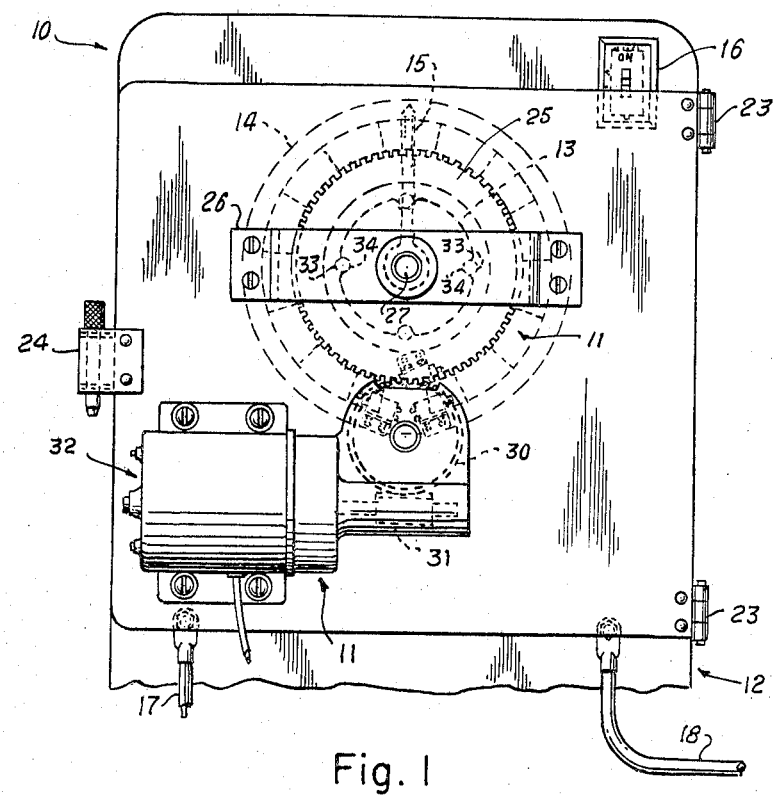
FIGURE 1 is a fragmentary front elevational view of a welding machine as described having an attachment embodying the invention, shown fragmentarily, showing a hinged panel on which the motor and the arrangement of gears are mounted in one of its operating positions overlying the knob and one of the gears operatively connected to the knob, by mutually engaging means on the knob and one of the gears, for rotation therewith.

Referring to the drawing, the numeral 10 designates generally a welding machine as described, and the numeral 11 indicates generally an attachment embodying the invention whereby the amperage of the welding machine 10 may be controlled from a distant location corresponding to the welding site.

The welding machine 10 has a casing, shown fragmentarily and indicated generally by the numeral 12, and has a control knob 13 and a dial 14 on the outside of the casing 12 for regulating manually, by adjusting the rotative position of the knob 13, the amperage of the machine 10. The knob 13 has a pointer 15 thereon which coacts with the dial 14 to indicate the amperage as a function of the rotative position of the knob 13.

Figure 3:
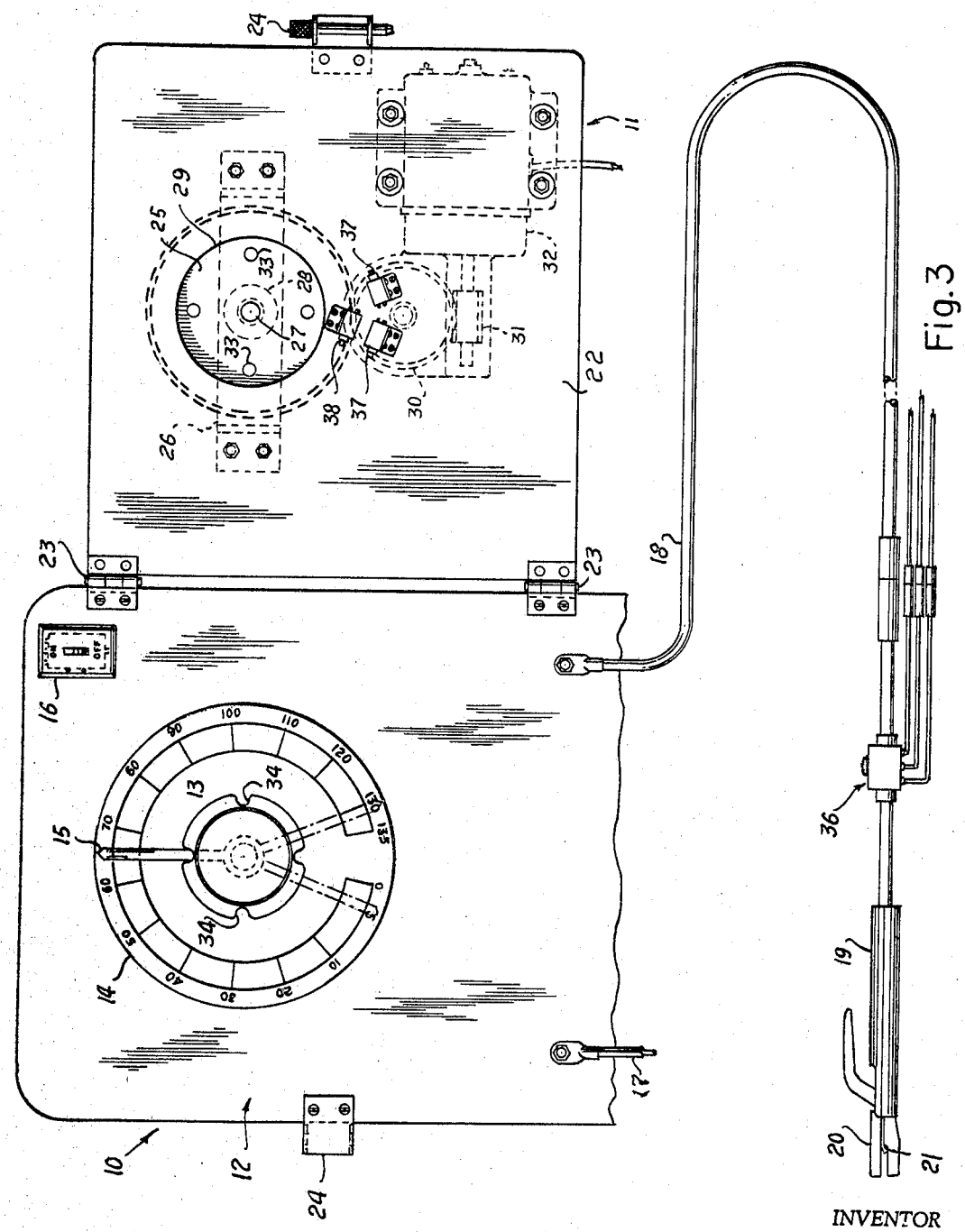
FIGURE 3 is a view similar to FIGURE 1 showing said panel in another of its operating positions in which said one of said gears is disengaged from said knob, showing the welding cable and showing the selector switch of the invention operatively positioned thereon.
Figure 4:
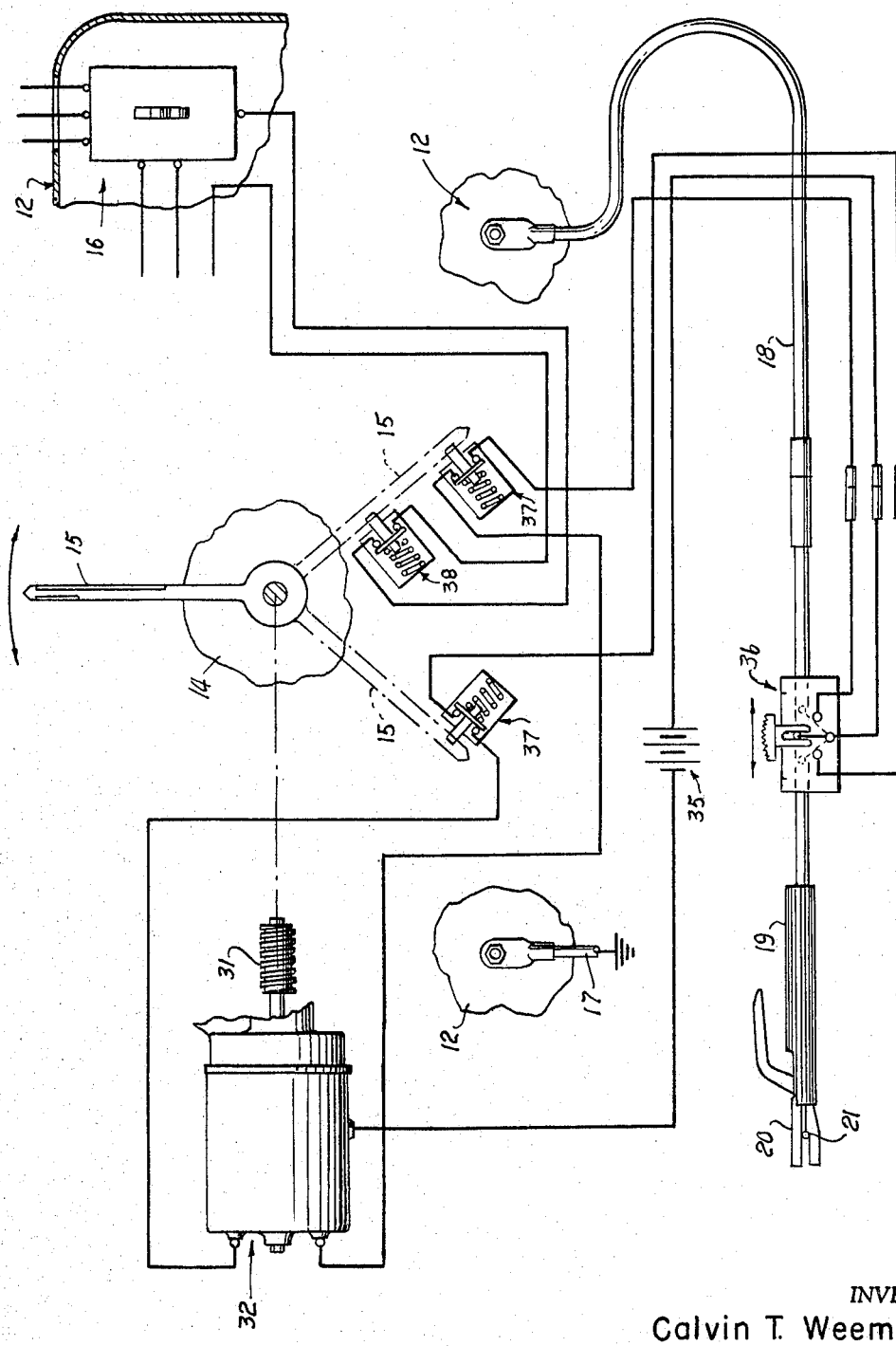
FIGURE 4 is a schematic view including an electrical diagram.

The welding machine 10 further includes a cut off switch 16 whereby it is operatively connected to an available source of electricity, and has a pair of welding cables 17 and 18, one of which is grounded and the other of which has the usual hand grip 19 and clip 20 thereon, adjacent its outer end, for attachment of the welding electrode, as at 21, FIGURES 3 and 4.

Figure 2:
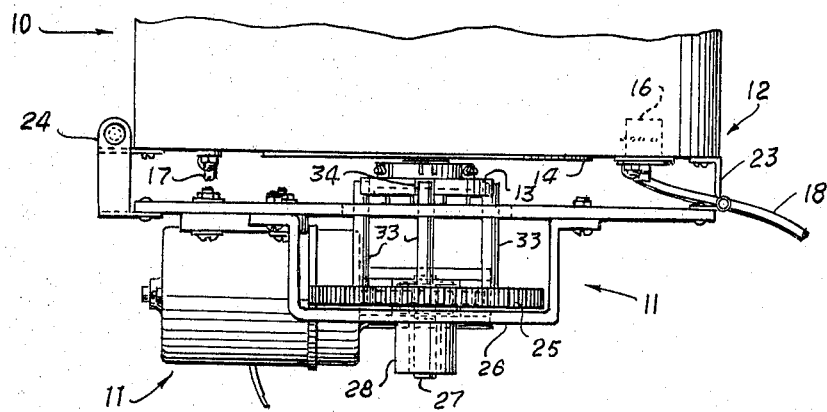
FIGURE 2 is a fragmentary top plan view thereof.

The attachment 11 includes a panel 22 which is connected by hinges 23 to the outside of the casing 12, and in one of its operating positions, shown in FIGURES 1 and 2, overlies the knob 13 and the dial 14. The hinges 23 have their pivots spaced apart from the casing 12, and in said one of its operating positions the panel 22 extends to the adjacent side of the casing 12, in spaced apart relation thereto, and is removably secured in that position by fastening means 24.

A gear 25 is rotatably supported exteriorly of the hinged panel 22, between the panel 22 and an angularly bent bracket 26, exteriorly thereof, having a middle portion extending parallel to the panel 22, in spaced apart relation thereto, in the position of the panel 22 above mentioned.

The gear 25 is mounted on a stub shaft 27 which is journaled in a bearing 28 therefor exteriorly of the bracket 26, and the panel 22 has a hole 29 therein, relatively smaller than the gear 25, in opposing relation thereto.

The gear 25 is connected by a relatively smaller gear 30 to a worm gear 31 on the shaft of an electric motor 32, which is mounted on the panel 22, exteriorly thereof, whereby the gear 25 is adapted to be driven by the motor 32, at a relatively slower speed.

The gear 25 has a plurality of four circumferentially spaced pins 33 which extend perpendicularly from the inner face thereof, through the hole 29 in the panel 22, for abutting engagement with corresponding indentations 34 in the peripheral edge of the knob 13, whereby the knob 13 is rotatable with the gear 25.

In the arrangement above described, the motor 32, which is reversible, and the gears 31, 30 and 25, act on the knob 13, which controls the amperage of the machine 10, to raise or lower the amperage according to the direction of rotation of the motor 32.

The motor 32 is operatively connected in two electrical circuits, each including a power source, such as a battery 35, and one of the contacts of a selector switch 36, for operating the motor 32 in either direction, as desired, by remote control.

A pair of normally closed, spring biased switches 37, each operatively connected in one of the above mentioned circuits, which are responsive to the rotative position of the knob 13, are arranged to interrupt the flow of current to the motor 32 as the knob 13 reaches its limit of travel in either direction.

A normally closed, spring biased switch 38, operatively connected in an electrical circuit including the cutoff switch 16 whereby electricity is supplied to the machine 10, which is responsive to the rotative position of the knob 13, is arranged to interrupt the flow of current to the machine 10 as the knob 13 reaches its limit of travel in one direction corresponding to its maximum amperage setting.

The invention, as shown and described, is capable of certain changes in structure and design, by persons skilled in the art, without departing from the spirit and intent thereof or from the scope of the appended claims.

What is claimed is:

1. In a remote amperage control device for welding apparatus having a housing, a generator and impelling means therefor, and a manual control knob on said housing for regulating the amperage output of the generator, the improvements comprising: a panel having means thereon for hinged attachment to said housing and overlying said knob in its operative position, the said panel having an opening therein coinciding with said knob, a reversible motor on said panel and a gear reduction unit having a driven connection with said motor, a gear mounted on said panel driven by said reduction unit and reversibly rotatable in a plane spaced from and parallel to the plane of said panel opposite said opening therein, a plurality of pins projecting perpendicularly from one face of said gear and extending through the opening in said panel in its operative position, whereby to engage corresponding indentations formed peripherally of said knob for rotating the latter in either direction, electrical circuits for said motor, and a switch in said circuits remote from said motor for operating the same.

2. The structure of claim 1, the motor being operatively connected in two electrical circuits, each including a power source and one of the contacts of a selector switch, for operating the motor in either direction by remote control.

3. The structure of claim 2, and a pair of normally closed, spring biased switches, each operatively connected in one of said circuits, responsive to the rotative position of the knob, arranged to interrupt the flow of current to the motor as the knob reaches its limit of travel in either direction.

4. The structure of claim 3, and a normally closed, spring biased switch, operatively connected in an electrical circuit whereby electricity is supplied to the machine, responsive to the rotative position of the knob, arranged to interrupt the flow of current to the machine as the knob reaches its limit of travel in one direction corresponding to its maximum amperage setting.

References Cited

UNITED STATES PATENTS

| 2,189,603 | 2/1940 | Graham | 219—132 |
| 2,305,206 | 12/1942 | Strobel | 219—132 |
| 2,642,515 | 6/1953 | Bagg | 219—132 |
| 2,872,566 | 2/1959 | Leppala | 219—132 |

OTIS L. RADER, Primary Examiner

K. L. CROSSON, Assistant Examiner

U.S. Cl. X.R.

219—132